Jan. 15, 1946.        K. C. BUGG        2,393,140
COLLET CHUCK
Filed Nov. 1, 1943
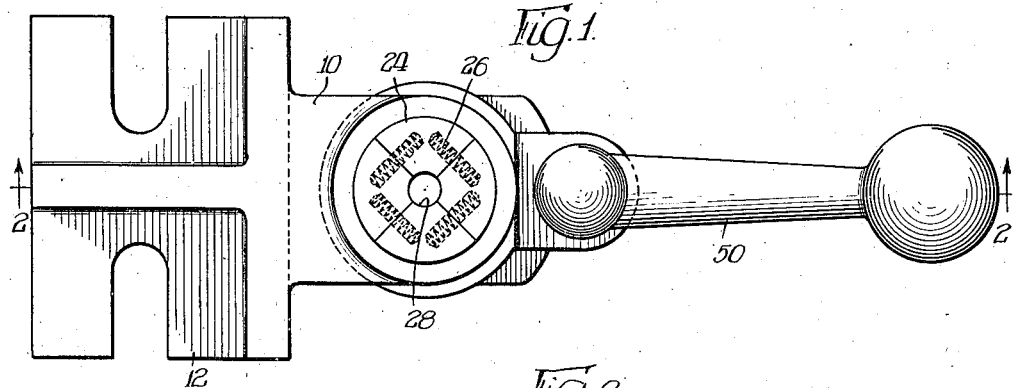
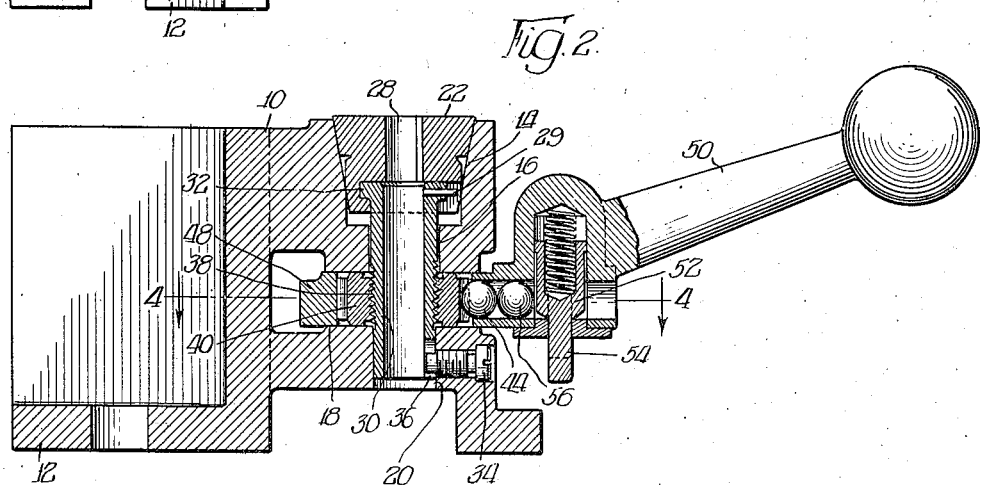
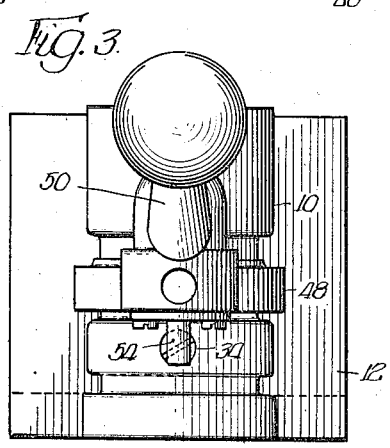
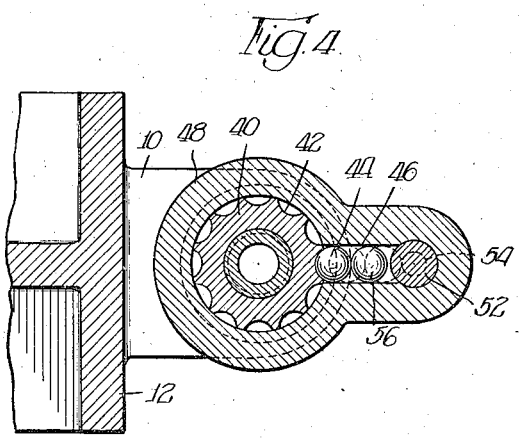
INVENTOR.
Kenly C. Bugg,
BY Patented Jan. 15, 1946

2,393,140

UNITED STATES PATENT OFFICE 2,393,140

COLLET CHUCK

Kenly C. Bugg, Fort Wayne, Ind.

Application November 1, 1943, Serial No. 508,503

6 Claims. (Cl. 279—58)

This invention pertains to a collet chuck.

It is an object of the invention to provide a simplified collet which may be supplied in condition where it may be formed to any desired size and shape of the object or objects to be held, and may then be re-formed up to the capacity of the jaws thereof.

Another object of the invention is to provide a collet which may be formed and may be readily operable though made out of substantially any desired material.

Another object of the invention is to provide a collet having a chuck readily adapted to be formed by the user with the desired hole through the chuck jaws, the device being so constructed and arranged that the jaws will always be centered and operable with respect to the center line of the tool forming the hole.

With these and various other objects in view, the invention may consist of certain novel features of construction and operation as will be more fully described and particularly pointed out in the specification, drawing and claims appended hereto.

In the drawing, which illustrates embodiments of the device and wherein like reference characters are used to designate like parts:

Figure 1 is an end elevation of the collet embodying the invention;

Figure 2 is a sectional elevation through the collet shown in Figure 1, the same being taken substantially in the plane as indicated by the line 2—2 of Figure 1;

Figure 3 is an end elevation of the collet illustrated in Figure 1, the same looking toward the left, as viewed in said figure; and Figure 4 is a fragmentary sectional elevation taken substantially in the plane as indicated by the line 4—4 of Figure 2.

The collet consists essentially of the housing or block 10, provided with support and fastening means such as illustrated at 12. The housing 10 is provided with the chuck receiving cam portion 14, which is substantially frusto-conical, communicating with the cylindrical bore 16. The cylindrical bore communicates with the operating nut cavity 18, which in turn communicates with the bore 20 aligned with and substantially of the same diameter as the bore 16. The chuck 22 comprises the four segments 24 urged apart by means of the springs 26, and as shown, the chuck is formed as at 28 to the desired size and shape bore. The chuck segments may be furnished unbored or unformed as to the bore, and thereafter formed to suit the purpose for which they are to be used. They are then always centered as to the tool forming the holes. From time to time they may be rebored up to the limit of the chuck segments.

The outer or peripheral surface of the chuck segments are complementarily formed with respect to the cam portion 14, that is, the chuck is substantially frusto-conical, and one of the segments is positioned by means of the pin 29 secured to the drawing sleeve 30, the sleeve being provided with the flange 32, receivable in a complementary recess in each of the chuck segments. The sleeve 30 is prevented from rotating by means of the locking pin 34, receivable in a slot 36 provided in said sleeve. The sleeve is threaded as at 38, and is adapted to be reciprocated by the operating nut 40, disposed in the operating nut cavity 18. The operating nut is provided with ball receiving cavities 42, adapted to receive the ball 44, disposed in the recess 46 provided in the operating lever housing 48.

The housing is provided with the operating handle 50, said handle having the spring pressed plunger 52, so constructed and arranged that when the end 54 of said plunger is moved upwardly as viewed in Figure 2, the plunger 52 will clear the second ball 56 to permit release between the ball 44 and the nut 40. This will permit the handle 50 to be moved to any desired convenient position, whereupon release of the plunger 52 will cause re-engagement between the ball 44 and the adjacent indentation 42. Oscillation of the handle 50 causes movement of the nut 40, which in turn reciprocates the sleeve 30 to cause the jaws 24 of the chuck to ride up and down the incline 14, whereupon said jaws are closed or opened for holding or releasing work held in said chuck.

It is to be understood that I do not wish to be limited by the exact embodiments of the device shown, which are merely by way of illustration and not limitation, as various and other forms of the device will, of course, be apparent to those skilled in the art without departing from the spirit of the invention or the scope of the claims.

I claim:

1. A collet chuck comprising a housing member, said housing member being provided with a substantially frusto-conical chuck receiving cam portion, a substantially frusto-conical chuck disposed in said cam portion, said chuck comprising jaw segments and means urging said segments apart, a cylindrical bore axially disposed with respect to and communicating with said cam portion, an operating nut cavity communicating with said bore and open at one side thereof, a drawing member non-rotatably and loosely connected to said segments and having a threaded portion extending through said bore and nut cavity, a nut insertable through the open side of said cavity disposed in said cavity and having threads engaging said first named threads, movement of the nut moving said drawing member axially of said cam portion to selectively open and close said segments, means for rotating said nut, said last named means comprising a lever, having a lever housing embracing and rotatably mounted on said nut in said nut cavity, said nut having spaced cavities around the periphery thereof, a movable member adapted to be received in a cavity, and releasable means for holding said movable member in a cavity whereby rotation of the lever rotates said nut.

2. A collet chuck comprising a housing member, said housing member being provided with a substantially frusto-conical chuck receiving cam portion, a substantially frusto-conical chuck disposed in said cam portion, said chuck comprising jaw segments and means urging said segments apart, a cylindrical bore axially disposed with respect to and communicating with said cam portion, said housing member having an operating nut cavity communicating with said bore and open at one side thereof through said housing member for the reception of an operating nut, a drawing member non-rotatably and loosely connected to said segments and having a threaded portion extending through said bore and nut cavity, means for preventing rotation of said drawing member, a nut insertable through the open side of said cavity disposed in said cavity and having threads engaging said first named threads, movement of the nut moving said drawing member axially of said cam portion to selectively open and close said segments, and means for rotating said nut.

3. A collet chuck comprising a housing member, said housing member being provided with a substantially frusto-conical chuck receiving cam portion, a substantially frusto-conical chuck disposed in said cam portion, said chuck comprising jaw segments and means urging said segments apart, a cylindrical bore axially disposed with respect to and communicating with said cam portion, an operating nut cavity communicating with said bore and open at one side thereof, a drawing member non-rotatably and loosely connected to said segments and having a threaded portion extending through said bore and nut cavity, means for preventing rotation of said drawing member, a nut disposed in said cavity and having threads engaging said first named threads, movement of the nut moving said drawing member axially of said cam portion to selectively open and close said segments, means for rotating said nut, said last named means comprising a lever having a lever housing embracing and rotatably mounted on said nut in said nut cavity, said nut having spaced cavities around the periphery thereof, a movable member adapted to be received in a cavity, and releasable means for holding said movable member in a cavity whereby rotation of the lever rotates said nut.

4. A collet chuck comprising a housing member, said housing member being provided with a substantially frusto-conical chuck receiving cam portion, a substantially frusto-conical chuck disposed in said cam portion, said chuck comprising jaw segments and means urging said segments apart, a bore in said housing member axially disposed with respect to and communicating with said cam portion, said housing member having a cavity communicating with said bore and open at one side thereof through the housing, a reciprocable non-rotating member disposed in said bore and loosely connected to said segments for moving said segments, and means within said cavity and extending therefrom for reciprocating said reciprocable member.

5. A collet chuck comprising a housing member provided with a substantially frusto-conical chuck receiving cam portion, a substantially frusto-conical chuck disposed in said cam portion, said chuck comprising jaw segments and means urging said jaw segments apart, a cylindrical bore axially disposed with respect to and communicating with said cam portion, an operating nut cavity communicating with said bore and open at one side, a drawing member non-rotatably and loosely connected to said segments and having a threaded portion extending through said nut cavity, a nut insertable through the open side of said cavity disposed in said cavity and having threads engaging said first named threads, movement of the nut moving said drawing member axially of said cam portion to selectively open and close said segments, means for rotating said nut, said last named means comprising a lever, oscillatable means oscillatable by said lever and engaging said nut for rotating said nut, and means between said oscillatable means and lever operable to render said lever inoperative to oscillate said oscillatable means.

6. A collet chuck comprising a housing member provided with a substantially frusto-conical chuck receiving cam portion, a substantially frusto-conical chuck disposed in said cam portion, said chuck comprising jaw segments and means urging said jaw segments apart, a cylindrical bore axially disposed with respect to and communicating with said cam portion, an operating nut cavity communicating with said bore and open at one side, a drawing member non-rotatably and loosely connected to said segments and having a threaded portion extending through said nut cavity, a nut insertable through the open side of said cavity disposed in said cavity and having threads engaging said first named threads, movement of the nut moving said drawing member axially of said cam portion to selectively open and close said segments, means for rotating said nut, said last named means comprising a lever, oscillatable means oscillatable by said lever and engaging said nut for rotating said nut, and relatively releasable means between said lever and oscillatable means for securing said lever in selected positions with respect to said nut.

KENLY C. BUGG.